(12) United States Patent
Gohda et al.

(10) Patent No.: US 7,308,119 B2
(45) Date of Patent: Dec. 11, 2007

(54) IMAGE RETRIEVAL APPARATUS AND METHOD, AND IMAGE DISPLAY APPARATUS AND METHOD THEREOF

(75) Inventors: Makoto Gohda, Tokyo (JP); Hiroto Oka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/982,802

(22) Filed: Nov. 8, 2004

(65) Prior Publication Data

US 2005/0157952 A1 Jul. 21, 2005

(30) Foreign Application Priority Data

Nov. 26, 2003 (JP) ............................. 2003-395735
Dec. 1, 2003 (JP) ............................. 2003-402031

(51) Int. Cl.
G06K 9/00 (2006.01)

(52) U.S. Cl. .................... 382/118; 382/190; 382/219; 382/282

(58) Field of Classification Search ................. 382/115, 382/117, 118, 190, 209, 219, 278, 282; 340/5.52, 340/5.53
See application file for complete search history.

(56) References Cited

U.S. PATENT DOCUMENTS

| | | | | |
|---|---|---|---|---|
| 5,412,738 A | * | 5/1995 | Brunelli et al. ............. | 382/115 |
| 5,432,866 A | * | 7/1995 | Sakamoto ................... | 382/128 |
| 5,546,598 A | * | 8/1996 | Yamaguchi et al. ........ | 345/501 |
| 5,835,616 A | * | 11/1998 | Lobo et al. .................. | 382/118 |
| 5,842,194 A | * | 11/1998 | Arbuckle ..................... | 706/52 |
| 6,035,074 A | | 3/2000 | Fujimoto et al. ........... | 382/282 |
| 6,054,999 A | * | 4/2000 | Strandberg .................. | 345/474 |
| 6,345,109 B1 | * | 2/2002 | Souma et al. ............... | 382/118 |
| 6,417,969 B1 | * | 7/2002 | DeLuca et al. ............. | 359/630 |
| 6,445,810 B2 | * | 9/2002 | Darrell et al. .............. | 382/115 |
| 6,460,764 B1 | * | 10/2002 | Sakanashi et al. .......... | 235/380 |
| 6,611,613 B1 | * | 8/2003 | Kang et al. ................. | 382/118 |
| 6,624,843 B2 | * | 9/2003 | Lennon ........................ | 348/61 |
| 6,697,502 B2 | * | 2/2004 | Luo ............................. | 382/115 |
| 6,698,653 B1 | * | 3/2004 | Diamond et al. ........... | 235/375 |
| 6,919,892 B1 | * | 7/2005 | Cheiky et al. .............. | 345/473 |
| 2003/0179213 A1 | | 9/2003 | Liu .............................. | 345/619 |

FOREIGN PATENT DOCUMENTS

CN 1445696 10/2003

(Continued)

OTHER PUBLICATIONS

Laurenz Wiskott, et al., "Face Recognition by Elastic Bunch Graph Matching," IEEE Transactions on Pattern Analysis and Machine Intelligence, vol. 19, No. 7, pp. 775-779 (Jul. 1997).

*Primary Examiner*—Yosef Kassa
(74) *Attorney, Agent, or Firm*—Fitzpatrick, Cella, Harper & Scinto

(57) ABSTRACT

Image data containing the face image of a person is retrieved from a plurality of images, the retrieved image data is displayed, face image data, which is for image retrieval, is extracted from the displayed image data, and the extracted face image data is registered as reference face image data. Specified reference face image data in the registered reference face image data is designated and image data that contains the reference face image data is retrieved.

20 Claims, 11 Drawing Sheets

FOREIGN PATENT DOCUMENTS

| | | |
|---|---|---|
| JP | 10-334213 | 12/1998 |
| JP | 11-282873 | 10/1999 |
| JP | 2001-357067 | 12/2001 |
| JP | 2002-183734 | 6/2002 |
| JP | 2003-76990 | 3/2003 |
| JP | 2003-099777 | 4/2003 |

* cited by examiner

FIG. 7

| IMAGE NAME | FACE AREA 1 | FACE AREA 2 | FACE AREA 3 | ...... | FACE AREA n |
|---|---|---|---|---|---|
| A000.jpg | (120,50),(150,90) | (250,100),(300,200) | (420,345),(565,580) | ...... | (704,96),(795,143) |
| A001.jpg | (250,100),(320,190) | (472,67),(523,189) | (0,0),(0,0) | ...... | (0,0),(0,0) |
| A002.jpg | (0,0),(0,0) | (0,0),(0,0) | (0,0),(0,0) | ...... | (0,0),(0,0) |
| ...... | ...... | ...... | ...... | ...... | ...... |
| A00m.jpg | (325,234),(465,332) | (280,509),(367,765) | (0,0),(0,0) | ...... | (0,0),(0,0) |

701 — IMAGE NAME
702 — FACE AREA 1
703 — FACE AREA 2
704 — FACE AREA 3
705 — FACE AREA n

IMAGE RETRIEVAL APPARATUS AND METHOD, AND IMAGE DISPLAY APPARATUS AND METHOD THEREOF

FIELD OF THE INVENTION

This invention relates to an image retrieval apparatus and method for retrieving image data, which includes the face of a person, from image data representing a plurality of images, to an image display apparatus and method for displaying images, and to a storage medium storing a program for executing the retrieval method.

BACKGROUND OF THE INVENTION

Owing to the increasing popularity of digital cameras and digital video cameras in recent years, it is becoming increasingly common for an individual to possess a large quantity of digital image data. If the quantity of image data possessed thus becomes very large, the method used to retrieve desired image data from this image data becomes important. For example, there is need for a method used when it is desired to retrieve from digital image data only images in which the faces of persons appear or only images in which the face of a specific individual appears.

By performing retrieval in this manner, it becomes possible to execute processing through which digital image data in which a specific individual appears is placed in a specific folder or through which only the face area is cut from the image data and combined with other digital image data.

A technique for retrieving the area of the face of an individual from image data that contains the face of the individual includes pre-registering data, which characterizes the face of the individual, as reference face data in order to retrieve the specific individual, compare the registered reference face data with image data that is the object of the search, and retrieve an image area having face data that resembles the reference face data (see the specification of Japanese Patent Application Laid-Open No. 2002-183734).

In the image retrieval described above, however, it is necessary to register the reference face data in advance. As will be described below, such image retrieval does not lend itself to consumer products because the operation involved is troublesome.

Specifically, when face data serving as a reference for the object of a search is registered, the image file containing the face desired to be registered is designated, the image data of this image file is displayed and the face to serve as the reference is registered by designating the area of the desired face in the image. At this time feature data that characterizes the face is extracted from the image data of the face and the feature data is stored as the reference face data.

Next, when retrieval is carried out, the image file to be retrieved is designated. When this is done, the reference face data characterizing reference faces and the image data of the image file to be retrieved are compared and image data containing the face that most resembles the sought face is retrieved.

With the conventional retrieval apparatus, the operation for registering the reference face data desired to be retrieved and the operation for retrieving a face in image data are separate operations, as described above. The user seeking to perform retrieval, therefore, is required to carry out the troublesome operation of registering reference face data in advance. This does not lend itself to the users of consumer products in particular.

Further, if the face of an individual has been retrieved, the user interface that determines how the retrieved face will be shown to the user also is important.

The specification of Japanese Patent Application Laid-Open No. 10-334213 discloses an invention entitled "Image Processing Apparatus and Medium Storing Program for Controlling Image Processing Apparatus". The disclosed invention detects a face area in digital image data containing a picture of a person by comparing color data of the image and face-recognition color data prepared in advance and displays by complementary color data in inverse video a face area having the largest area, thereby indicating to the user where the face area to be retrieved is located. Further, by touching a "SELECT" button, a face area having the next largest area is detected and this face area is displayed in inverse video.

Though the specification of Japanese Patent Application Laid-Open No. 10-334213 discloses that a plurality of face areas in digital image data of a single image are displayed in inverse video one after another by the "SELECT" button, the specification makes no disclosure whatsoever concerning a user interface for a case where there are multiple images represented by digital image data having face areas.

Further, when retrieval of a face is actually performed by a user, generally digital image data of a plurality of images is retrieved. A problem is that a user interface for dealing with retrieved multiple images becomes necessary.

SUMMARY OF THE INVENTION

Accordingly, a feature of the present invention is to provide an image retrieval apparatus, method and storage medium that make it possible to readily execute registration of reference face data that serves as a retrieval reference, and retrieval processing that makes use of this reference face data.

Another feature of the present invention is to so arrange it that digital image data of a desired image can be displayed from digital image data of a plurality of images, and to provide an image display apparatus and method whereby a face area in digital image data can be displayed on a display screen by a simple method.

According to an aspect of the present invention, there is provided with an image retrieval apparatus comprising: face retrieving means for retrieving image data that contains the face of a person from plural items of image data; display means for displaying the image data that has been retrieved by the face retrieving means; registering means for extracting face data, which is for image retrieval, from the image data displayed by the display means, and registering the face data as reference face data; and image retrieving means for retrieving image data, which contains specified reference face data from among the reference face data registered by the registering means, from the plural items of image data.

According to an aspect of the present invention, there is provided with an image retrieval method comprising: a face retrieving step of retrieving image data that contains the face of a person from plural items of image data; a display step of displaying the image data that has been retrieved in the face retrieving step; a registering step of extracting face data, which is for image retrieval, from the image data displayed in the display step, and registering the face data as reference face data; and an image retrieving step of retrieving image data, which contains specified reference face data from among the reference face data registered in the registering step, from the plural items of image data.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a diagram illustrating an example of the structure of a file that stores a face area detected by a face-area detector according to the second embodiment;

DETAILED DESCRIPTION OF THE PREFERRED EMBODIMENTS

A preferred embodiment of the present invention will now be described in detail with reference to the accompanying drawings.

First Embodiment

Figure 1:
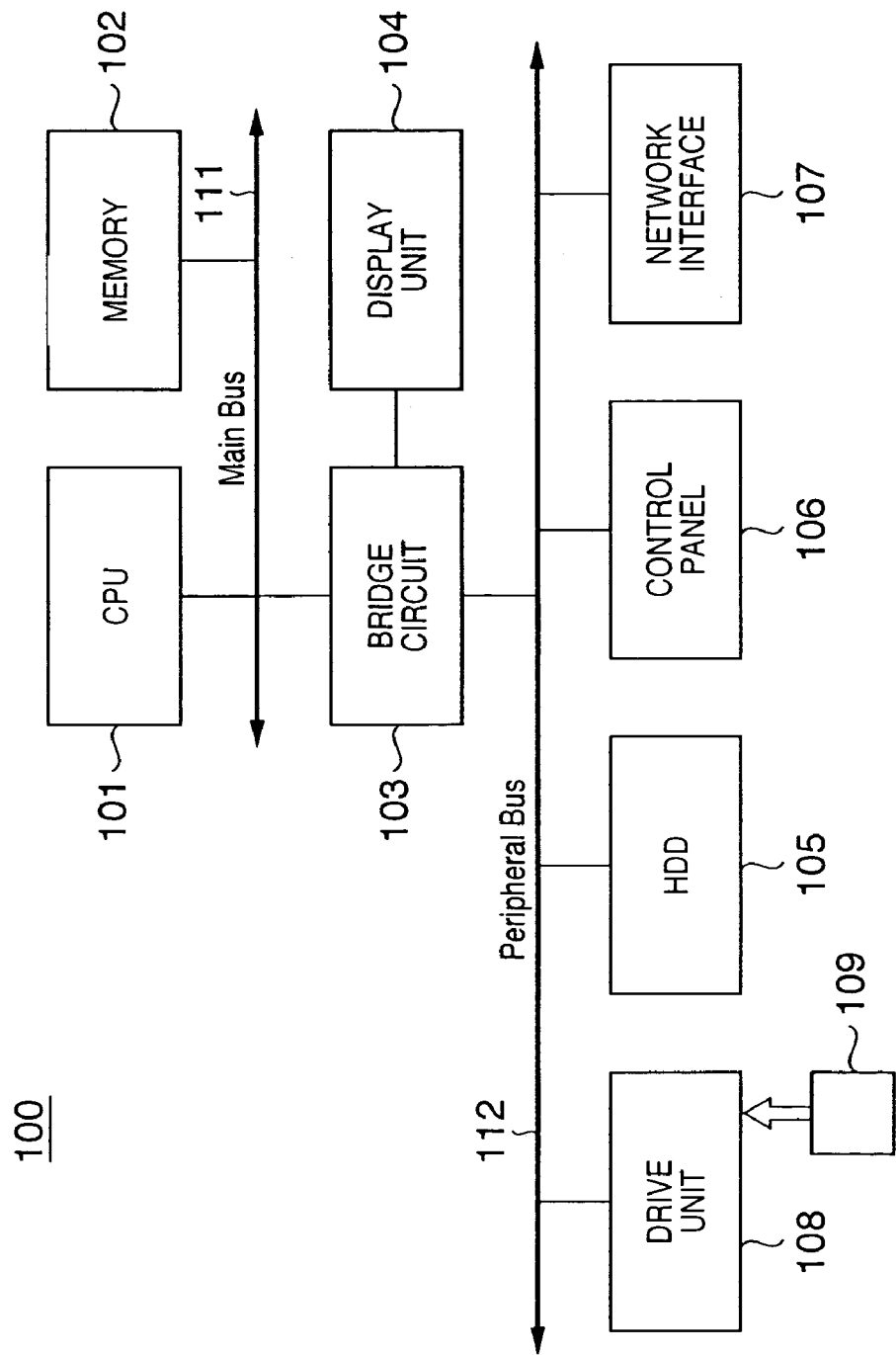
FIG. 1 is a block diagram illustrating the structure of a retrieval apparatus according to a first embodiment of the present invention.

FIG. 1 is a block diagram illustrating the structure of a retrieval apparatus according to a first embodiment of the present invention. This embodiment will be described with regard to a case where the retrieval apparatus is implemented by an ordinary personal computer 100.

As shown in FIG. 1, the retrieval apparatus includes a CPU 101 for controlling the overall operation of the apparatus, and a memory 102. The memory 102 has a ROM storing a BIOS and a booting program, etc., and a program area (RAM), which is used as a work area when control processing is executed by the CPU 101, for storing various data temporarily or for loading a program executed by the CPU 101. A bridge circuit 103 connects a main bus 111 and a peripherals bus 112. The apparatus further includes a display unit 104 such as a CRT display or liquid crystal panel, and a large-capacity storage device 105, such as a hard disk (HDD) connected to the peripherals bus 112, for recording the program executed by the CPU 101 and digital data such as image data. It should be noted that a retrieval program described later has previously been installed on the hard disk 105 as program code readable by the CPU 101. In response to a command from a control panel 106, the program code is loaded into the memory 102 and executed by the CPU 101. The control panel 106 is equipped with a keyboard and with a pointing device such as a mouse. A drive unit 108 is for reading a removable storage medium (a floppy disk, CD, DVD or memory card, etc.). Also provided is an external storage medium 109 such as a CD-ROM or DVD-ROM.

The first embodiment will be described with regard to a case where a program has been recorded on the hard disk 105. However, the program may be stored on the external storage medium 109 such as a CD-ROM and the program may be executed by the CPU 101 via the drive unit 108. Similarly, the program may be executed upon downloading it to the memory 102 via a network interface (I/F) 107.

In the first embodiment, an operating system runs on the personal computer 100. The program of the operating system is stored on the hard disk 105. After power is introduced to the system, the program is loaded into the main memory 102 and is executed sequentially by the CPU 101, thereby controlling the bridge circuit 103, display unit 104, hard disk 105, control panel 106 and network interface 107 in order to provide service to the user. The face retrieval program of this embodiment runs on the operating system of personal computer 100.

Retrieval processing in the retrieval apparatus of the first embodiment will be described next.

Figure 2:
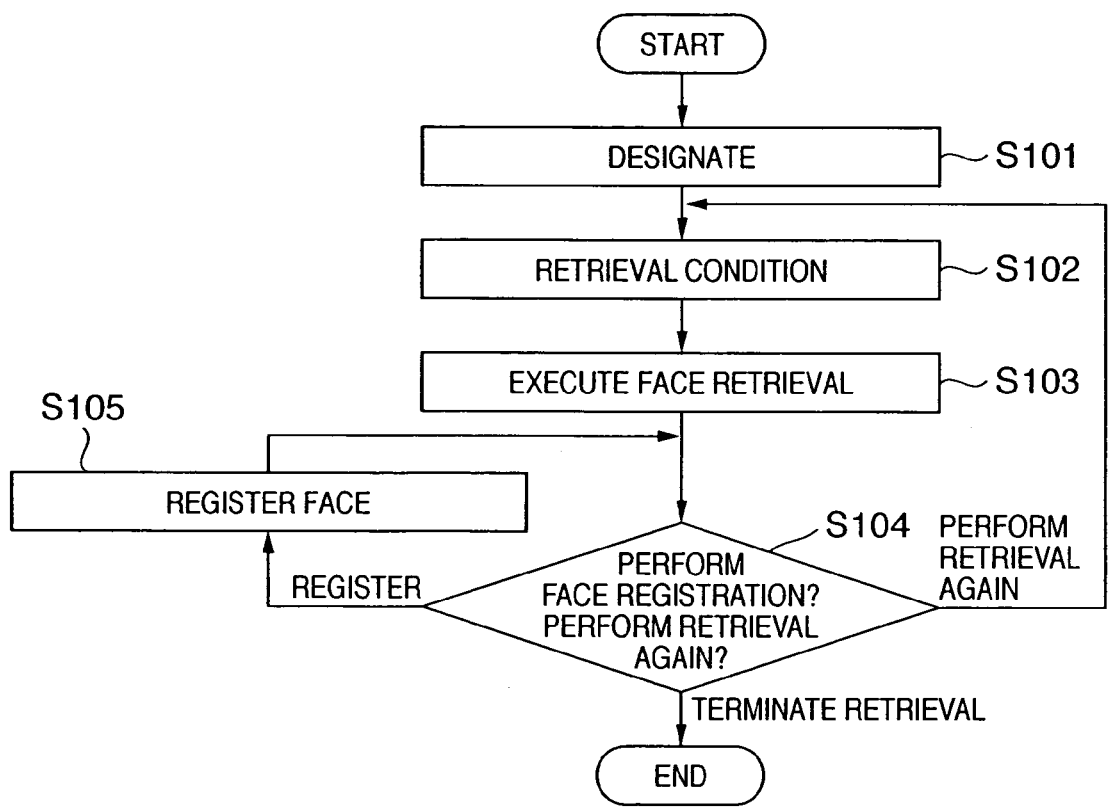
FIG. 2 is a flowchart for describing retrieval processing in the retrieval apparatus according to the first embodiment.

FIG. 2 is a flowchart for describing registration of reference face data and retrieval processing in the retrieval apparatus according to the first embodiment. The program for executing this processing is stored in the hard disk 105. When the application is launched by a command from the control panel 106, the program is loaded into the memory 102 and is then executed by the CPU 101.

When processing starts, a user interface (UI) screen is displayed on the display unit 104 and a range indicating the object of a search is designated by the user at step S101.

Figure 3:
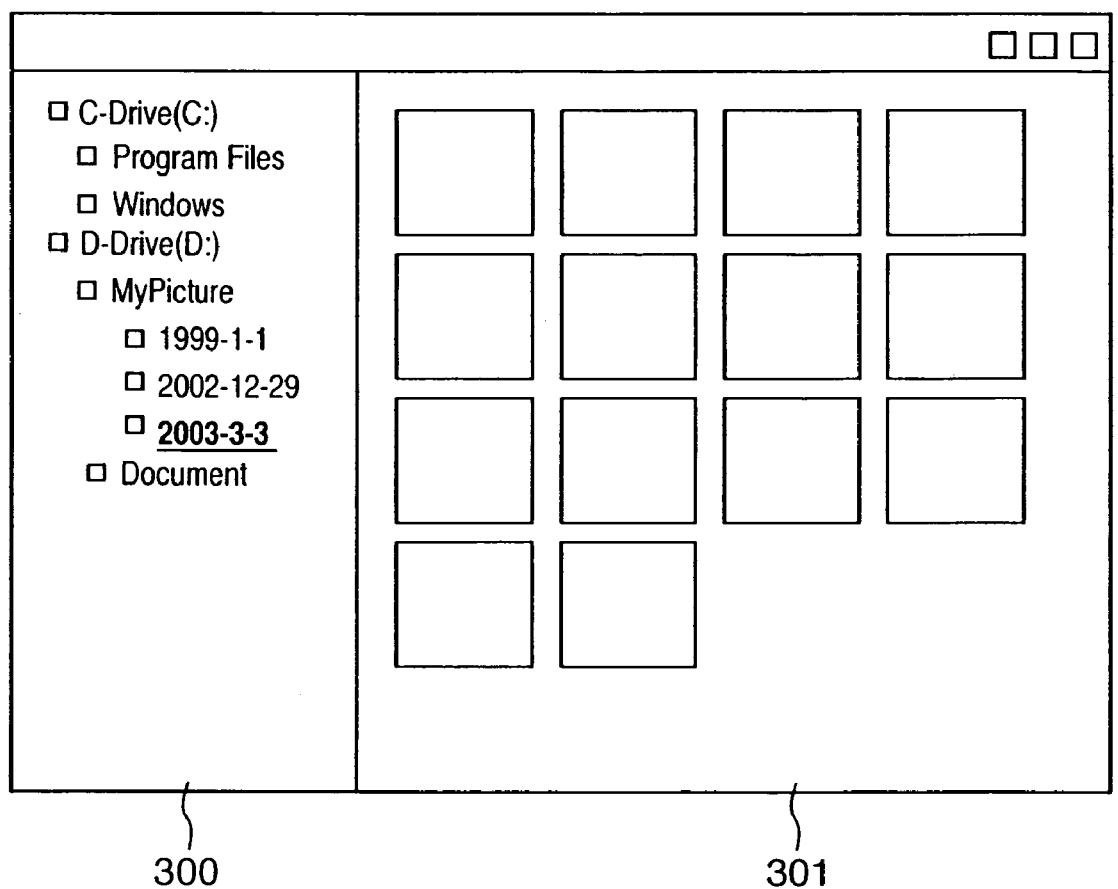
FIG. 3 depicts a diagram illustrating an example of a window display for designating an image that is the object of retrieval in the retrieval apparatus according to the first embodiment.

FIG. 3 depicts a diagram illustrating an example of a window displayed on the display unit 104 at this time.

In FIG. 3, a file system managed by the operating system of the personal computer 100 is being displayed. The screen has a left side 300 that displays, in tree-like fashion, a file structure managed by the file system, and a right side 301 that displays an array of thumbnails of image files contained in a directory (a directory "2003-3-3" in "My Picture") of a D-drive. At step S101, the user designates the search range from the file-structure information displayed in FIG. 3 using the control panel 106. The search range may be designated by specifying a plurality of files individually or by specifying a plurality of files in directory units. FIG. 3 illustrates a state in which the directory "2003-3-3" has been selected.

Next, control proceeds to step S102, where a screen for specifying a image retrieval condition is displayed on the display unit 104 to allow the user to enter the retrieval condition.

Figure 4:
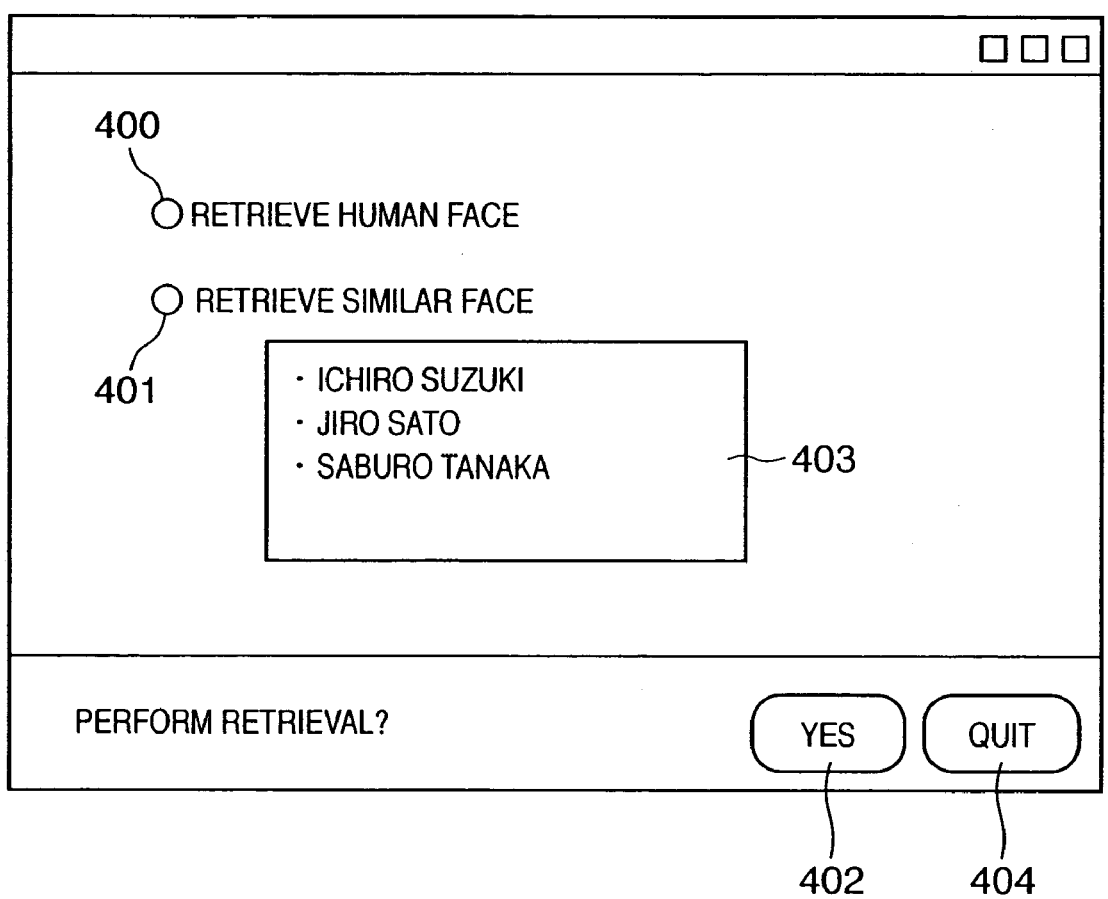
FIG. 4 depicts a diagram illustrating an example of a window displayed on a display unit at a step S102 in FIG. 2.

FIG. 4 depicts a diagram illustrating an example of a window displayed on the display unit 104 at the step S102.

The following two retrieval conditions are provided to the user:

(1) retrieval of human faces (specified by a check button 400); and (2) retrieval of a face resembling a specific individual (specified by a check button 401).

The user selects a desired retrieval condition from these two choices. Described next, in the order mentioned, will be operation in a case where the user has selected "RETRIEVE HUMAN FACE" and operation in a case where the user has selected "RETRIEVE SIMILAR FACE".

Described first will be a case where the user selects "RETRIEVE HUMAN FACE" (checks the check button 400) and registers the human face as reference image data.

At step S102, the user checks the check button 400 and clicks a "YES" button 402, whereupon control proceeds to step S103. Here retrieval is conducted based upon the retrieval condition that was set at step S102. In processing for retrieving a face executed here, use is made of a technique that employs a face graph and a wavelet transform proposed by Laurenz Wiskott et al. (Laurenz Wiskott, Jean-Marc Fellous, Nobert Kruger and Christoph von der Malsburg, "Face Recognition by Elastic Bunch Graph Matching", IEEE Trans. on Pattern Analysis and Machine Intelligence, vol. 19, no. 7, pp. 775-779, 1997).

In accordance with this technique, coarse contour detection of a face area is performed using a wavelet transform. More specifically, a face graph comprising a small number of nodes is applied to the image, a wavelet transform is executed with regard to each node and a graph judged to indicate the feature of the face, namely the area of the face, is detected. By repeating this operation with regard to a plurality of images that are the object of the search, images containing the face and the position of the face can be retrieved.

Next, at step S104, the user selects whether to re-conduct retrieval, register face data, which is the result of a search, as reference face data, or terminate retrieval.

Figure 5:
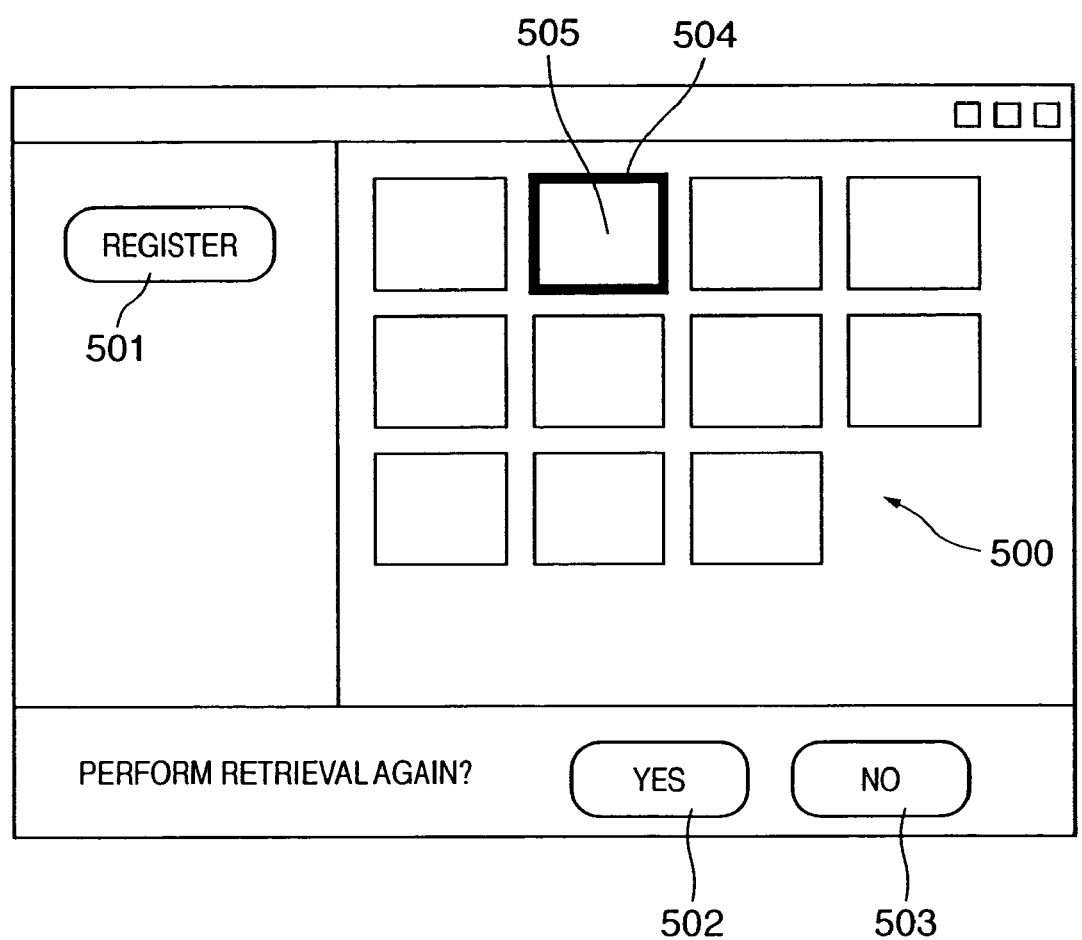
FIG. 5 depicts a diagram illustrating an example of a user interface screen displayed on a display unit at a step S104 in FIG. 2.

FIG. 5 depicts a diagram illustrating an example of a user interface screen displayed on the display unit 104 at the step S104.

Displayed on the screen are an image display section 500 indicating result of retrieval, a "REGISTER" button 501, a "YES" button 502 for specifying retrieval again, and a "NO" button 503 for not specifying retrieval again, i.e., for specifying termination of retrieval. If the user wishes to perform retrieval again, then the user clicks the "YES" button 502 and control returns to step S102 so that the retrieval conditions are set again in the manner described above. It should be noted that if "RETRIEVE HUMAN FACE" has been specified, then only images containing a face are displayed in image display section 500. If "RETRIEVE SIMILAR FACE" (described later) has been specified, then only images containing the person resembling the designated face (the reference face) are displayed.

Further, if the user terminates retrieval, the user clicks the "NO" button 503, whereupon retrieval processing is terminated.

If an image in the image display section 500 displaying the result of retrieval is selected by a cursor frame 504 and the selected face data is to be registered as reference face data, then the user clicks the "REGISTER" button 501. As a result, in the example of FIG. 5, the image data representing an image 505 selected by the cursor frame 504 is registered as reference face data. The reference face data thus registered is stored on the hard disk 105.

In this case, if the "REGISTER" button 501 in FIG. 5 is clicked, control proceeds from step S104 to step S105. Here face data characterizing the face is generated from the face image data (which has been designated by the cursor frame 504) the user wishes to register as the reference face, and the generated face data is registered as reference face data. In actuality, after the inclination and size, etc., of the face are corrected based upon the face area coarsely detected at step S103, a face graph comprising a large number of nodes inclusive of the positions of individual parts (eyes, mouse, nose, ears and the like) of the face is created using a wavelet transform again. The face graph created here becomes the face data characterizing the original face. Furthermore, if the "REGISTER" button 501 is clicked at the time of registration, a screen for entering a name that specifies the image data of this face, namely the name of the individual associated with the face or an ID, is displayed on the display unit 104. Using the control panel 106, the user enters the name of the individual or the ID, etc., whereby the image data can be registered in specifiable fashion.

If registration of reference face data is thus terminated at step S105, control returns to step S104. Here the screen illustrated in FIG. 4 is displayed to prompt the user to execute processing for registering face data of another image as the result of retrieval as reference face data, or to execute "RETRIEVE HUMAN FACE" using the face data that has been registered, or to select termination of retrieval. The foregoing is a description for a case where the user has selected "RETRIEVE HUMAN FACE" in order to register reference face data.

Described next will be processing for a case where the user has selected "RETRIEVE HUMAN FACE" on the user interface screen of FIG. 4. What is important here is that "RETRIEVE HUMAN FACE" can be executed without changing the flow of user interface processing. It should be noted that if processing is terminated as is, it will suffice for the user to click a "QUIT" button 404.

If "RETRIEVE HUMAN FACE" is selected (i.e, if the check button 401 is checked), then a list of names of individuals registered as reference face data is displayed, as indicated at 403 in FIG. 4. For example, if "ICHIRO SUZUKI" at the head of the section 403 is selected as the "YES" button 402 that specifies the start of retrieval is clicked, then retrieval of images that contain the individual whose face resembles that of "ICHIRO SUZUKI" starts. It should be noted that a display area may be provided so that when the name of an individual in section 403 is designated, this display area will display the face of this individual in such a manner that the face of the designated individual can be verified. The face data that has been registered for this individual would be displayed in this display area. At this point, the face graph characterizing the face of "ICHIRO SUZUKI" is read out and is stored in the memory 102 as the reference face data.

Actual retrieval is executed at step S103. The program retrieves a face by the following operation: First, in a manner similar to that of "RETRIEVE HUMAN FACE" described above, coarse contour detection of the face area is performed using the wavelet-transform method applied to the target face data to be searched. That is, a face graph comprising a small number of nodes is applied to the image, a wavelet transform is executed with regard to each node and a graph judged to indicate the feature of the face, namely the area of the face, is detected. Next, after the face area thus detected is subjected to correction of the face inclination and size, etc., a face graph comprising a large number of nodes inclusive of the positions of individual parts of the face is created using a wavelet transform again. The face graph created here becomes the face data characterizing the face that is the object of the search. A feature of the face graph of the reference face ("ICHIRO SUZUKI") that has been stored in the memory 102 is compared with that of the face graph created here, and if the difference between these is less than a threshold value, it is judged that the face resembles the designated reference face ("ICHIRO SUZUKI").

By repeatedly executing this operation for all of a plurality of images that are the object of the search, images containing the face that resembles the face of a specific individual designated on the screen in FIG. 4, as well as the position of the face, can be specified.

The screen illustrated in FIG. 5 is presented to the user at step S104. In this case, as a result of the retrieval processing of step S103, a group of images (in case of a plurality of images) containing an individual judged to resemble "ICHIRO SUZUKI" is displayed in the image display section 500. The user then selects whether to terminate retrieval processing upon selecting a desired image from the images being displayed in the image display section 500, to perform retrieval again (in a manner similar to the case of "RETRIEVE HUMAN FACE") or to terminate retrieval.

In accordance with the first embodiment, as described above, the user can execute registration/retrieval of face data using a user interface that conforms to a single, unified flow. This makes it possible to execute face retrieval simply and in a very easily understandable manner.

Second Embodiment

Figure 6:
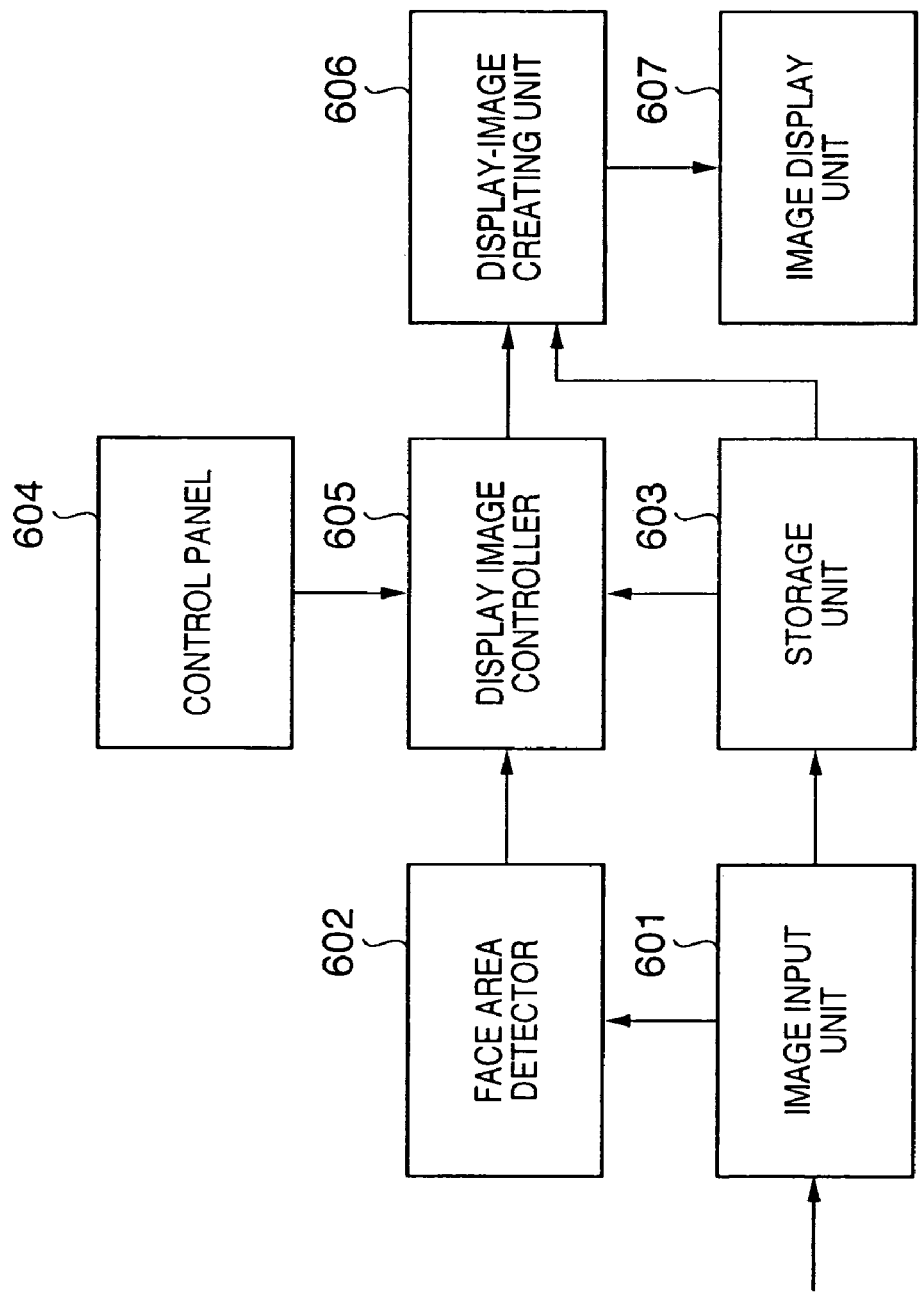
FIG. 6 is a block diagram illustrating an example of the structure of an image display apparatus according to a second embodiment of the present invention.

FIG. 6 is a block diagram illustrating an example of the structure of an image display apparatus according to a second embodiment of the present invention.

As shown in FIG. 6, the apparatus includes an image input unit 601 for inputting digital image data. The image input unit 601 may input digital image data contained in a memory or a secondary storage unit such as MO, HDD, DVD and the like, or may input digital image data from an external device such as a digital still camera, digital video camera or scanner via an analog or digital interface.

A face-area detector 602 is for detecting a face area from digital image data that has been input from the image input unit 601. The method of detecting the face area may be that disclosed in the specification of Japanese Patent Application Laid-Open No. 10-334213, by way of example. The method detects a face area in digital image data by comparing color data of the image and face-recognition color data prepared in advance. Alternatively, the method described in the first embodiment or another method may be used. The face-area detector 602 actually has a CPU and a memory storing a program executed by the CPU and is implemented by software.

A storage unit 603 is for storing digital image data that has been input from the image input unit 601. In a case where the digital image data that has been input from the image input unit 601 was from a memory or a secondary storage unit, then the storage unit 603 need not store the digital image data per se and may store a pointer of the memory or a file name of the secondary storage unit. The storage unit 603 actually comprises a memory or secondary storage unit.

The apparatus further includes a control panel 604, which accepts operations performed by the user, and has a keyboard and a pointing device such as a mouse.

Figure 11:
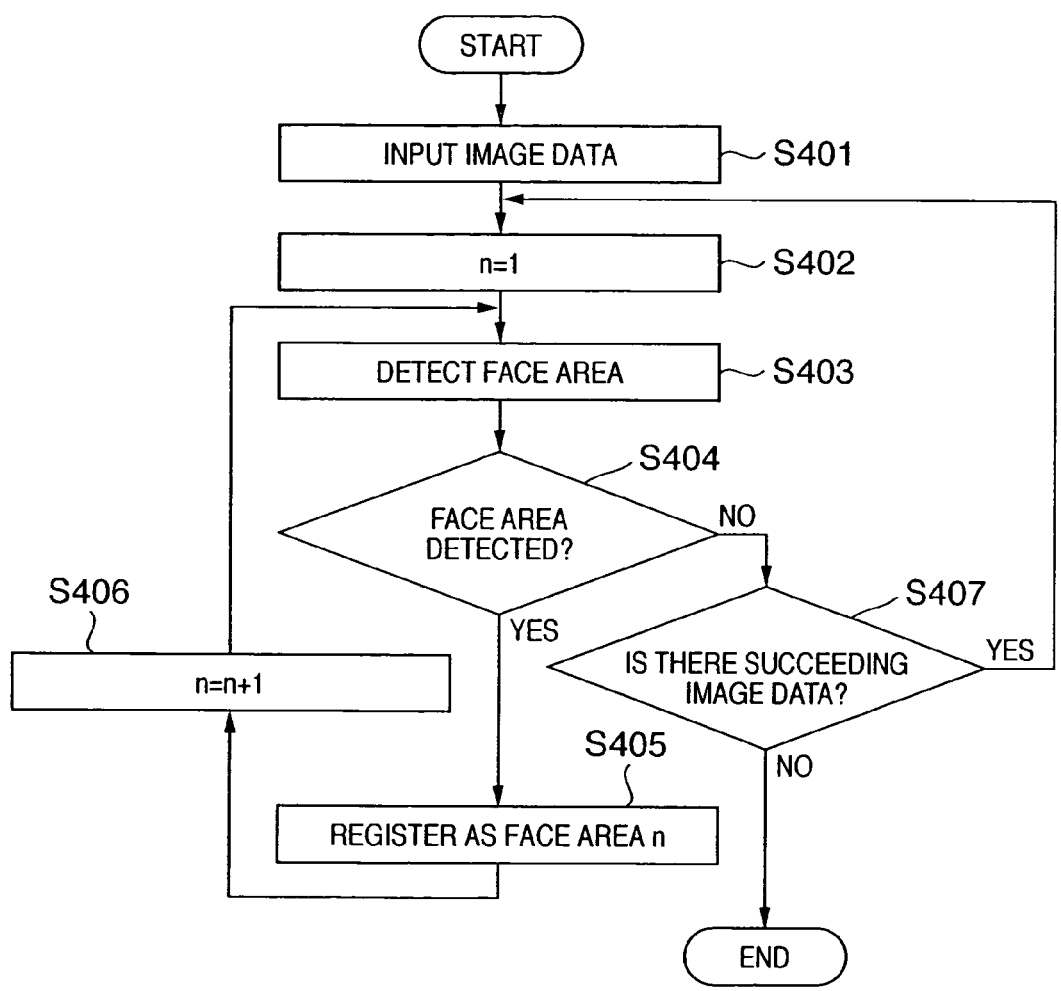
FIG. 11 is a flowchart for describing processing for detecting a face area from image data and storing the face area in memory according to the embodiment of the invention.

FIG. 11 is a flowchart for describing processing executed by the face-area detector 602 of the second embodiment.

If image data is input from the image input unit 601 at step S401, then a variable n (provided in a memory area of the storage unit 603) is set to "1" at step S402. Next, at step S403, it is determined whether the image data contains a face area is detected. This processing may employ the above-described technique using a face graph and wavelet transform proposed by Laurenz Wiskott et al., or any other well-known technique. Next, when it is judged at step S404 that the image data contains a face area, control proceeds to step S405, where rectangle information indicating the face area is created and registered in the storage unit 603 as a "FACE AREA n", as illustrated in FIG. 7. The variable n then is incremented at step S406 and control returns to step S403. The number of n corresponds to the number of the face areas 1 to n in FIG. 7.

When a face area is not found at step S404, control proceeds to step S407. Image data of a plurality of images is entered and it is determined whether image data that has not yet undergone face-area retrieval processing exists. If such image data exists, then the image data of the next image is selected, control proceeds to step S402 and the above-described processing is executed. When processing for retrieving all image data is thus completed, processing is terminated.

Figure 8:
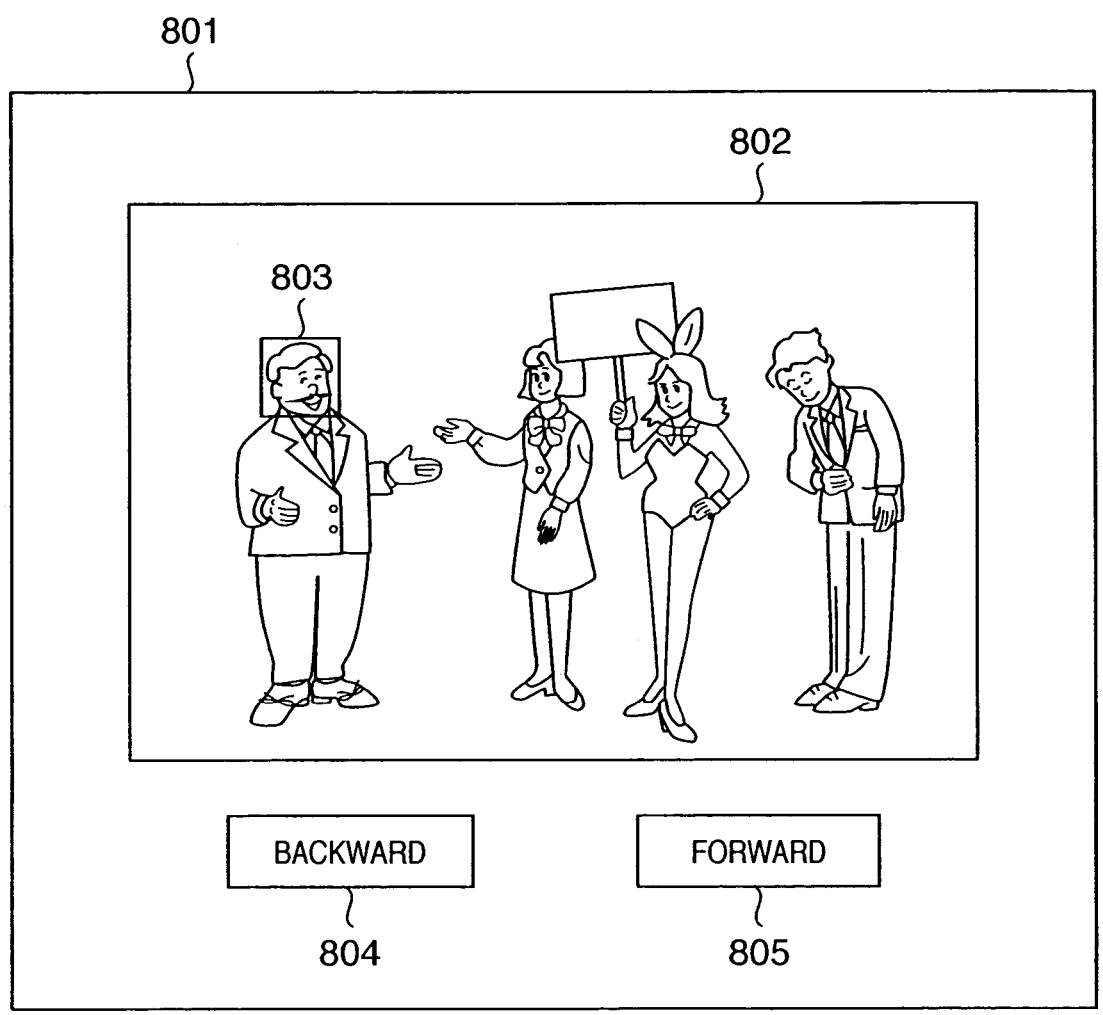
FIG. 8 depicts a diagram illustrating an example of a user interface according to the second embodiment.

FIG. 8 depicts an example of a user interface 801 according to the second embodiment. An image containing four persons is being displayed in FIG. 8. A frame 803 indicates that the face area of the person at the extreme left has been selected. This indicates the result of retrieval of an image in the first embodiment, by way of example. In this case, the face area enclosed by the frame 803 corresponds to a face area that is the object of a search.

Under these conditions, a "BACKWARD" button 804 or a "FORWARD" button 805 can be designated on the control panel 604. The control panel 604 comprises a mouse, a keyboard, a touch-sensitive panel or actual buttons. If the "FORWARD" button 805 is designated, the face area of the neighboring person on the right side is selected. Whenever the "FORWARD" button 805 is designated, face areas of the persons in a display section 802 are selected sequentially in the order of the face areas shown in FIG. 7. If the "FORWARD" button 805 is designated when the face area of the final person is being displayed, the image data of the next image is read out and displayed in the display section 802, and the first recognized and registered face area ("FACE AREA 1") of the person in this image is selected. Conversely, if the "BACKWARD" button 804 is designated, then face areas of the persons in a display section 802 are selected sequentially in the backward direction. For example, if the "BACKWARD" button 804 is designated in the state illustrated in FIG. 8, the image data of the previous image is read out and displayed in the display section 802, and the very last recognized and stored face area ("FACE AREA n") in this image is selected.

With reference again to FIG. 6, the apparatus further includes a display image controller 605 for storing a face area that has been detected by the face-area detector 602 and for controlling what digital image data will be displayed in the display section 802 of the digital image data in FIG. 8 and which face area will be selected and displayed by the frame 803. The face area detected by the face-area detector 602 is stored in the storage unit 603 as a data file of the kind shown in FIG. 7, by way of example.

FIG. 7 is a diagram useful in describing an example of storage of face areas that have been detected by the face-area detector 602.

In FIG. 7, image name 701 uniquely identifies the digital image data of each image. This may be a file name of the digital image data or a unique ID issued by the display image controller 605. Further, reference numerals 702 to 705 denote face areas that have been detected for every digital image by the face-area detector 602. These are provided in a number equivalent to the number (n) of face areas that have been detected for every image.

In the second embodiment, for the sake of simplicity the face area is represented by the rectangular frame 803 that encloses the image data of the face. It is assumed that the coordinates of the upper left corner and lower right corner of the rectangular frame indicating the face area are stored at 702 to 705. The portions under 702 to 705 where "(0,0), (0,0)" has been written signify that face data does not exist in these portions, i.e., that face areas do not exist here. Of course, only a portion in which a face appears may actually be represented by the frame 803.

In this case, it will suffice to store at 702 to 705 the upper left and lower right corners of the rectangular frame enclosing the face and mask data that masks only the face. Further, as a method of storing face areas, the table of the kind shown in FIG. 7 is utilized in the second embodiment for the sake of simplicity. However, the method is not actually limited to this method. For example, a conceivable method is to use a linear list to thereby eliminate the upper limit on number of face areas per image represented by the digital image data and conserve memory. A further conceivable method is to utilize the face areas detected by the face-area detector 602.

The display image controller 605, which is triggered by an input from the control panel 604, controls which digital image data in the digital image data 802 and which face area 803 within this image are to be selected and displayed next. Operation at this time will be described in detail later with reference to FIGS. 9 and 10. The display image controller 605 is actually implemented by a CPU and a memory storing a program, etc., executed by this CPU. Implementation is actually by software.

A display-image creating unit 606 in FIG. 6 is controlled by the display image controller 605 and creates digital image data displayed on the display section 802. The display-image creating unit 606 is instructed by the display-image creating unit 606 as to which image of digital image data should be displayed next, reads the digital image data of the indicated image out of the storage unit 603 and displays the image in the display section 802. Furthermore, the display-image creating unit 606 encloses, by the frame 803, a selected face area among the areas of faces stored in the data file (FIG. 7) of display image controller 605 and creates digital image data of an image displayed in the display section 802. It may be so arranged that "FACE AREA 1" of this image is selected in the initial state.

Of course, if a selected face area is displayed in inverted video, it will suffice to extract mask data from the display image controller 605 together with area coordinates and execute processing so as to display in inverse video only the masked area. The display-image creating unit 606 actually comprises a CPU and a memory storing a program, etc., executed by this CPU. Implementation is actually by software.

An image display unit 607 displays the user interface 801 shown in FIG. 8. The image represented by the digital image data created by the display-image creating unit 606 is displayed in the display section 802 of the user interface 801. The frame 803 indicates the face area that has been selected at the present time. The image display unit 607 actually comprises a monitor or the like.

Figure 9:
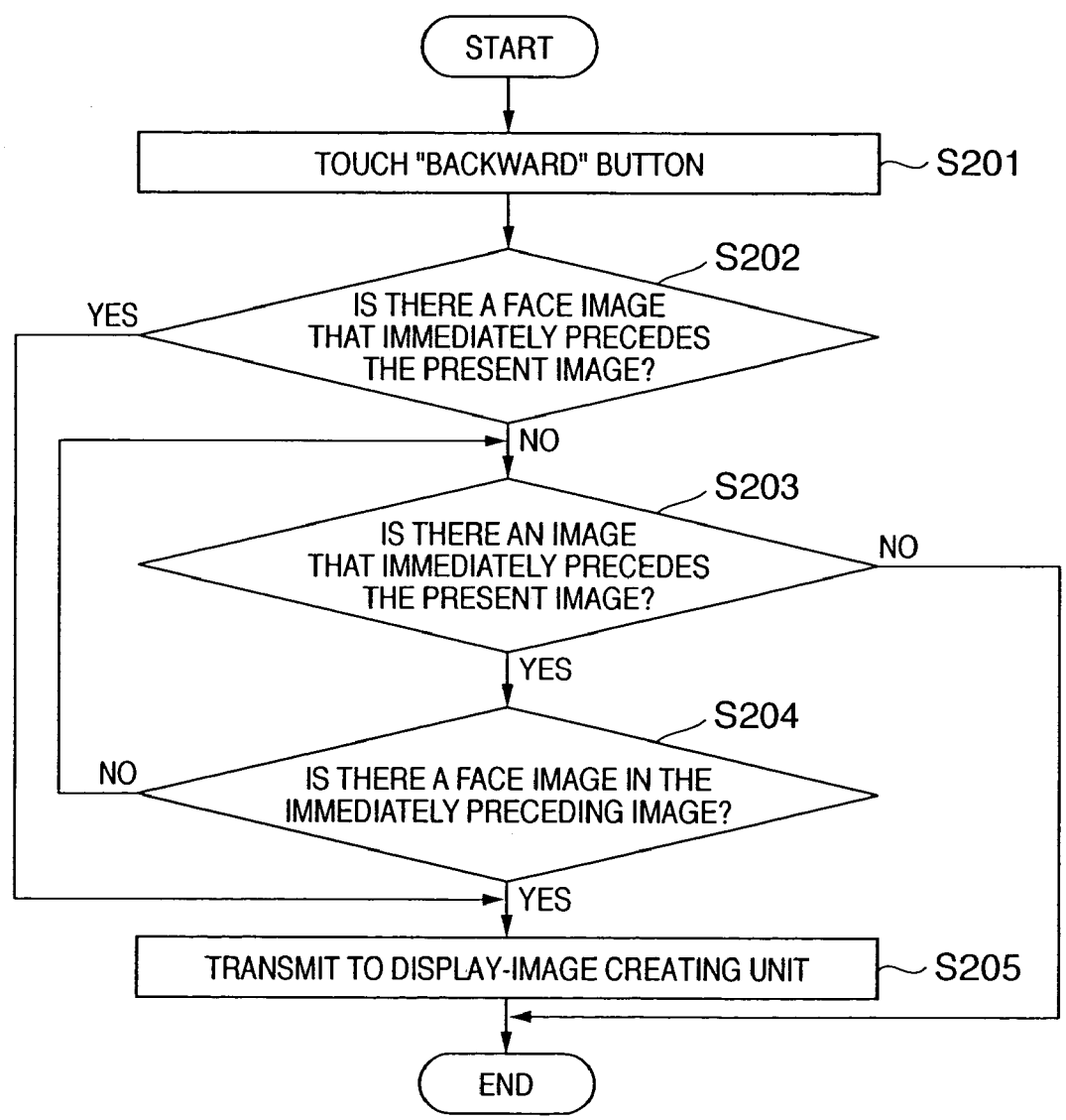
FIG. 9 is a flowchart for describing the operation of a display image controller when a "BACKWARD" button has been designated on a control panel of the image display apparatus according to the second embodiment.

The operation of the display image controller 605 will now be described in detail with reference to FIGS. 9 and 10. First, reference will be had to FIG. 9 to describe operation when the "BACKWARD" button 804 has been touched on the user interface 801 of FIG. 8. In the description that follows, the order of the image data indicates the order that has been registered in image name 701 in FIG. 7, for example, "BACKWARD" indicates the direction from bottom to top in the table of FIG. 7, and "FORWARD" indicates the direction from top to bottom in the table. Similarly, the order of the face areas indicates the direction from left to right in the table of FIG. 7, "BACKWARD" indicates the direction from right to left in the table of FIG. 7, and "FORWARD" indicates the direction from left to right in the table.

If the "BACKWARD" button 804 is designated at the first step S201, reference is had to the registered data of FIG. 7 and it is determined at step S202 whether there is a face area that immediately precedes the presently displayed image represented by the digital image data.

If the result of the determination at step S202 is that such a face area exists, then control proceeds to step S205, where the relevant face area is transmitted to the display-image creating unit 606 and operation is terminated.

If such a face area does not exist in the displayed image, however, then control proceeds to step S203, where reference is had to the registered data of FIG. 7 and it is determined whether an immediately preceding image represented by digital image data exists. Operation is terminated if an immediately preceding image does not exist. If an immediately preceding image represented by digital image data does exist, then control proceeds to step S204, where it is determined whether a face area exists in this immediately preceding image represented by the digital image data. If a face area does not exist in this image, then control returns to step S203 to determine whether a further preceding image exists. If image data in which a face area exists is thus found, then the final face area in the image represented by this image data is selected, control proceeds to step S205, the relevant face area is transmitted to the display-image creating unit 606 and operation is terminated. If the image data of the final image is investigated at step S203 and this image data does not contain a face area, then processing is terminated.

Figure 10:
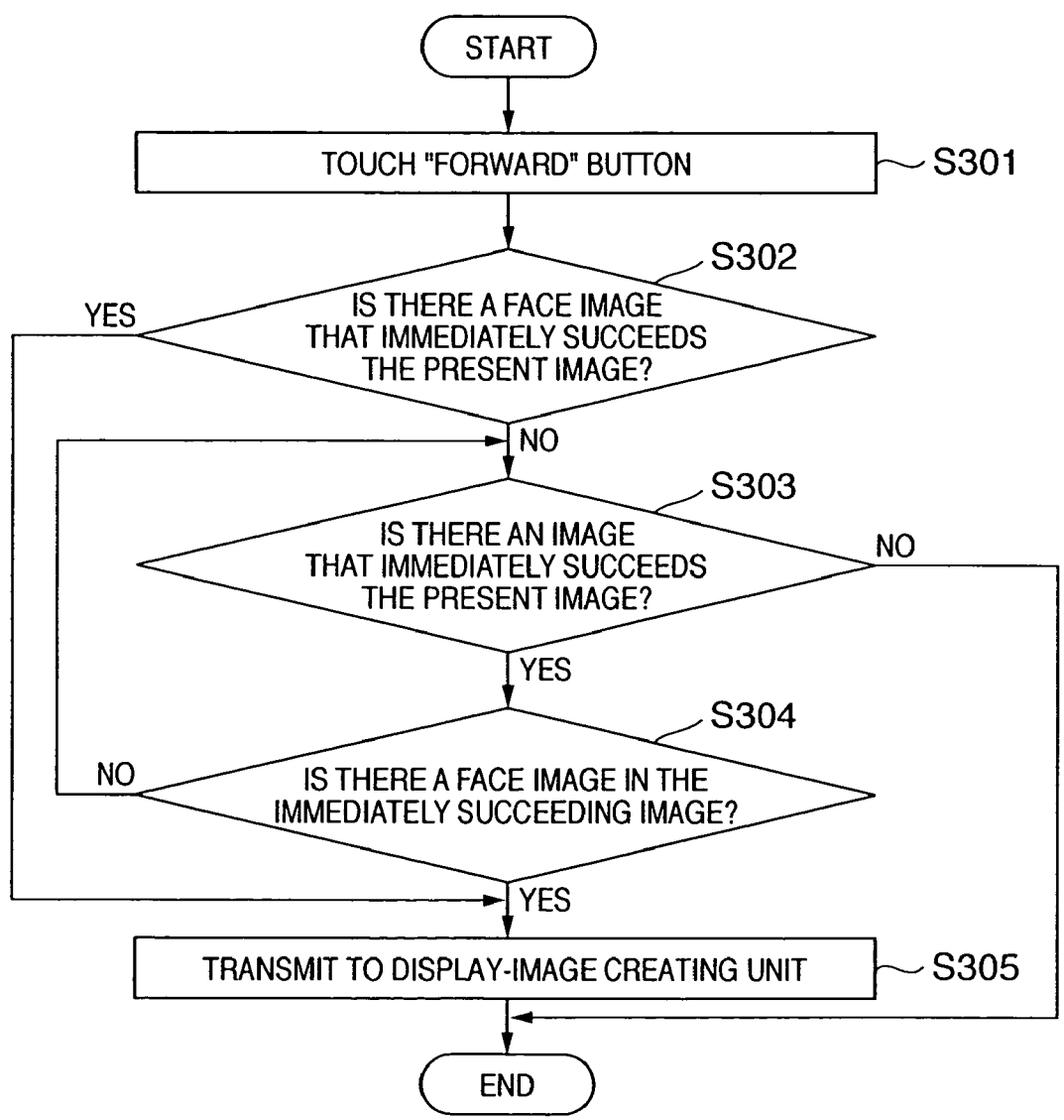
FIG. 10 is a flowchart for describing the operation of a display image controller when a "FORWARD" button has been designated on a control panel of the image display apparatus according to the second embodiment.

Next, reference will be had to the flowchart of FIG. 10 to describe operation when the "FORWARD" button 805 has been designated on the control panel 604.

If the "FORWARD" button 805 is designated at the first step S301, reference is had to the registered data of FIG. 7 and it is determined at step S302 whether there is a face area that immediately succeeds the presently displayed image represented by the digital image data.

If the result of the determination at step S302 is that such a face area exists, then control proceeds to step S305, where the relevant face area is transmitted to the display-image creating unit 606 and operation is terminated.

If such a face area no longer exists in the image data, however, then control proceeds to step S303, where reference is had to the registered data of FIG. 7 and it is determined whether an immediately succeeding image represented by digital image data exists. Operation is terminated if an immediately succeeding image does not exist.

If it is found at step S303 that an immediately succeeding image does exist, then it is determined whether a face area exists in this immediately succeeding image. If the face area exists, then control proceeds to step S304. Here the very first face area ("FACE AREA 1" in FIG. 7) in this image is designated and control proceeds to step S305, where the relevant face area is transmitted to the display-image creating unit 606 and operation is terminated. If a face area does not exist in this image, then control returns to step S303 to determine whether a further succeeding image exists.

Steps S303, S304 are executed until image data representing an image that contains a face area is detected. When an image containing a face area is not found even at termination of retrieval of succeeding image data, the processing is terminated. In the event that the "BACKWARD" button 804 is designated when the first face area in the very first image has been selected as is being displayed, and in the event that the "FORWARD" button 805 is designated when the final face area in the final image has been selected as is being displayed, the image display apparatus of this embodiment will not operate. However, this arrangement need not necessarily be adopted.

For example, in a case where the "BACKWARD" button 804 has been designated when the first face area ("FACE AREA 1") in the very first image has been selected, operation may be performed by forming a loop in such a manner that the final face area in the final image will be selected and displayed.

Further, it may be so arranged that when the first face area ("FACE AREA 1") in the very first image has been selected, the "BACKWARD" button 804 can no longer be designated, and such that when final face area in the final image has been selected, the "FORWARD" button 805 can no longer be designated.

In the second embodiment, a selected face area in an image represented by digital image data is marked by the frame 803 or is displayed in inverse video, whereby the face image is displayed in emphasized fashion. However, an operation other than this may be adopted. For example, it is possible to employ a user interface in which only the face area that has been selected is cut out and displayed.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions (processing executed on the side of a camera and various print processing executed on the side of a printer) of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, the present invention also covers a case where an operating system or the like running on the computer performs a part of or the entire process in accordance with the designation of program codes and implements the functions according to the embodiments.

Furthermore, the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiments. For example, it goes without saying that a case where these processing operations are performed by a driver in a personal computer corresponds to such an arrangement.

The present invention is not limited to the above embodiments and various changes and modifications can be made within the spirit and scope of the present invention. Therefore, to appraise the public of the scope of the present invention, the following claims are made.

What is claimed is:

1. An image retrieval apparatus comprising:
   retrieving means for retrieving at least one image that includes a face of a person from plural images;
   display means for displaying the at least one image retrieved by said retrieving means;
   designation means for designating an image from the at least one image displayed by said display means to register as reference face data;
   registering means for extracting feature data of the face in the image designated by said designation means and for registering the feature data as the reference face data, which is for image retrieval; and
   image retrieving means for retrieving an image which contains the reference face data registered by said registering means from a plurality of images, by extracting feature data of a face in each image within the plurality of images and comparing the extracted feature data with the feature data registered by said registering means.

2. The apparatus according to claim 1, wherein in a case where said display means displays the plurality of images, said designation means designates an image from the plurality of images.

3. The apparatus according to claim 2, wherein said registering means further comprises means for appending identification information to the feature data.

4. The apparatus according to claim 3, wherein said image retrieving means retrieves the image that contains the reference face data specified by the identification information.

5. The apparatus according to claim 1, wherein said designating means designates a face of a person in the image retrieved by said image retrieving means, in a case where the image includes a plurality of persons.

6. An image retrieval apparatus comprising:
   extracting means for extracting at least one image that includes a face of a person from plural images;
   display means for displaying the at least one image extracted by said extracting means;
   command means for, in a case where said display means displays a plurality of images, selecting and commanding registration of an image, which is for image retrieval, from the plurality of images;
   registering means, which is responsive to a command from said command means, for extracting feature data of the face in the image selected by said command means, and for registering the feature data as reference face data;

input means for inputting identification information of the reference face data registered by said registering means; and image retrieving means for retrieving, from the plurality of images, an image that includes the reference face data specified by using the identification information.

7. An image retrieval method comprising:
a retrieving step of retrieving at least one image that includes a face of a person from plural images;
a display step of displaying the at least one image retrieved in said retrieving step;
a designation step of designating an image from the at least one image displayed in said display step to register as reference face data;
a registering step of extracting feature data of the face in the image designated in said designation step, and for registering the feature data as the reference face data, which is for image retrieval; and
an image retrieving step of retrieving an image which contains the reference face data registered in said registering step from a plurality of images, by extracting feature data of a face in each image within the plurality of images and comparing the extracted feature data with the feature data registered in said registering step.

8. The method according to claim 7, wherein in a case where the display step displays the plurality of images, said designation step designates an image from the plurality of images.

9. The method according to claim 8, wherein said registering step further includes a step of appending identification information to the feature data.

10. The method according to claim 9, wherein the image that contains the reference face data specified by the identification information is retrieved in said image retrieving step.

11. The method according to claim 7, wherein said designating step designates a face of a person in the image retrieved in said image retrieving step, in a case where the image includes a plurality of persons.

12. A computer-readable storage medium storing a program for implementing the image retrieval method set forth in claim 7.

13. An image display apparatus comprising:
face-area detecting means for detecting a face area of each person contained in an image;
storage means for storing area information, which indicates the face area detected by said face-area detecting means, in association with the image;
image display means for displaying the image;
first selecting means for selecting the face area contained in a first image in response to a selection command, in a case that the first image includes a plurality of face areas;

second selecting means for, after all face areas of the first image have been selected by said first selecting means, selecting the face area contained in a second image in response to the selection command until all face areas of the second image have been selected; and
display control means for causing said image display means to display the first image or the second image in such a manner that the face area selected by said first or second selecting means is identifiable.

14. The apparatus according to claim 13, wherein said storage means stores the face area detected by said face-area detecting means in the form of rectangle information.

15. The apparatus according to claim 13, wherein in a case where a face area is selected by said first or second selecting means, said display control means displays the face area selected by said first or second selecting means with a frame appended thereto.

16. The apparatus according to claim 13, wherein in a case where a face area is selected by said first or second selecting means, said display control means displays, in inverse video, the face area selected by said first or second selecting means.

17. An image display method comprising:
a face-area detecting step of detecting a face area of each person contained in an image;
a storage step of storing area information, which indicates the face area detected in said face-area detecting step, in a memory in association with the image;
an image display of displaying the image;
a first selecting step of selecting the face area contained in a first image in response to a selection command, in a case that the first image includes a plurality of face areas;
a second selecting step of, after all face areas of the image have been selected in said first selection step, selecting the face area contained in a second image in response to the selection command until all face areas of the second image have been selected; and
a display control step of causing said image display step to display the first image or the second image in such a manner that the face area selected in said first or second selecting step is identifiable.

18. The method according to claim 17, wherein said memory stores the face area detected in said face-area detecting step in the form of rectangle information.

19. The method according to claim 17, wherein in a case where a face area is selected in said first or second selecting step, the selected face area is displayed with a frame appended thereto in said display control step.

20. The method according to claim 17, wherein in a case where a face area is selected in said first or second selecting step, the selected face area is displayed in inverse video in said display control step.

* * * * *